UNITED STATES PATENT OFFICE.

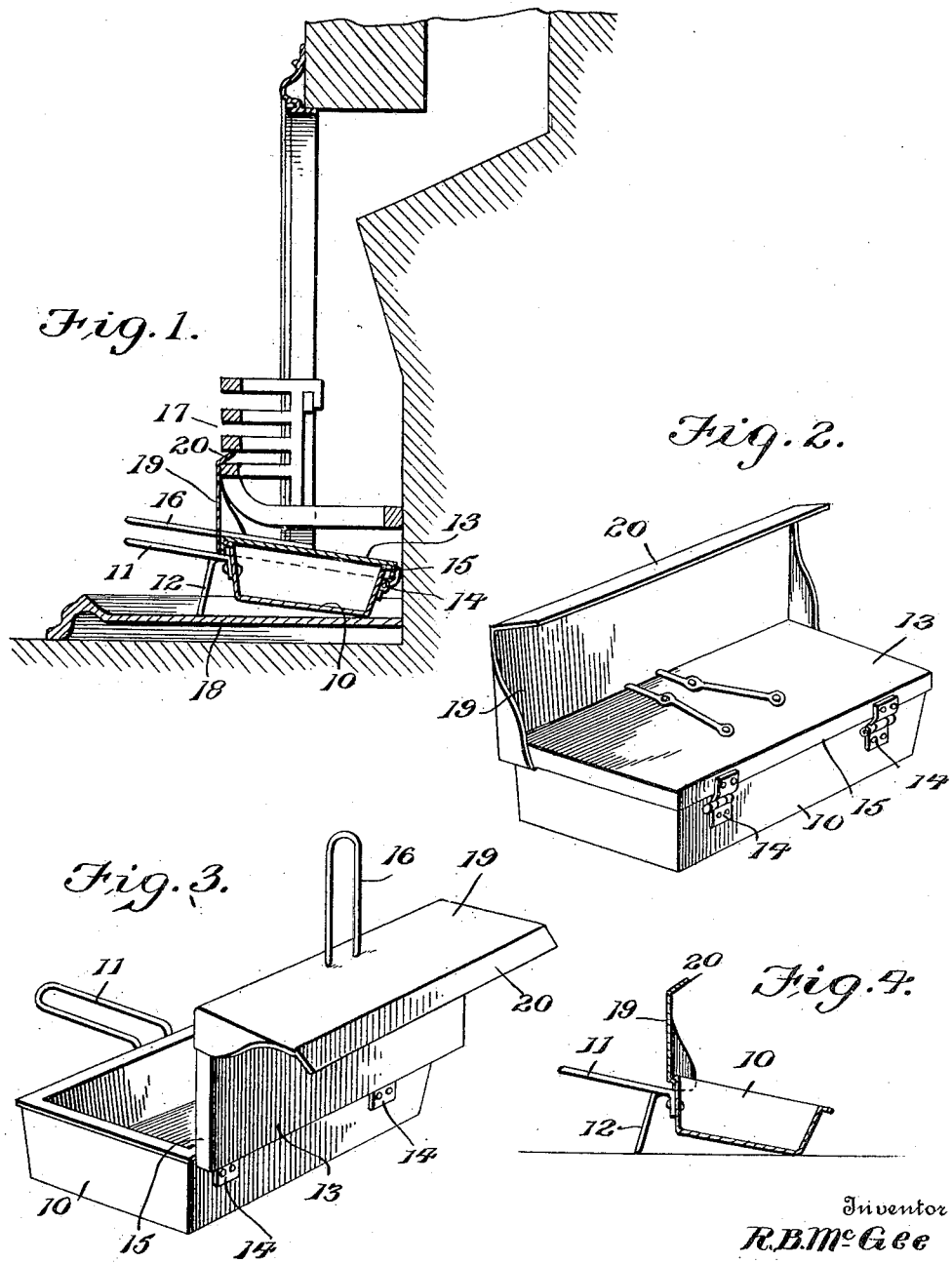

RICHARD B. McGEE, OF TRENTON, KENTUCKY.

COOKING UTENSIL.

1,125,581.  Specification of Letters Patent.  Patented Jan. 19, 1915.

Application filed February 12, 1914. Serial No. 818,394.

*To all whom it may concern:*

Be it known that I, RICHARD B. McGEE, a citizen of the United States, residing at Trenton, in the county of Todd and State of Kentucky, have invented certain new and useful Improvements in Cooking Utensils, of which the following is a specification.

This invention relates to improvements in cooking utensils, and has for one of its objects to provide a simply constructed device arranged to be employed in connection with an open grate, and whereby the heat from the grate is utilized to cook the contents of the device.

Another object of the invention is to provide a simply constructed device which may be applied without material structural change to grates of various forms.

With these and other objects in view the invention consists in certain novel features of construction as hereinafter shown and described and then specifically pointed out in the claims; and in the drawings illustrative of the preferred embodiment of the invention—Figure 1 is a vertical sectional view of a conventional grate with the improved device applied, and likewise in transverse section. Fig. 2 is a perspecive view of the improved device detached and in closed position. Fig. 3 is a persepctive view of the improved device with the closure open. Fig. 4 is a sectional detail illustrating a modification in the construction.

Corresponding and like parts are referred to in the following description and indicated in all the views of the drawings by the same reference characters.

The improved device comprises a receptacle 10 for the food to be cooked and constructed of any required size and any suitable material, but will generally be of sheet iron of the quality usually employed for baking pans. The receptable 10 is provided with a handle 11 and with a supporting leg 12, the latter preferably formed in connection with the handle to support the receptacle 10 at a slight incline as shown in Fig. 1, to form a low point in which the drippings and other juices from the food within the pan will flow, and likewise to dispose the device in position to receive the heat radiating from the grate more uniformly. A closure 13 is hingedly united at 14 to the body 10 and is preferably provided with a downwardly directed rim 15 which engages over the upper rim of the receptacle 10. A lifting handle 16 is connected to the closure 13 and extends in parallel relation to the handle 11 when the closure is in its downward position, as represented in Fig. 1, to enable both handles to be grasped by the same hand. The receptacle or body 10 together with its closure 13 is designed to be inserted beneath an ordinary open fireplace grate, represented conventionally at 17, with the support 12 bearing upon the base or hearth portion 18, so that the body 10 is maintained at a slightly inclined position toward the rear or inner wall of the fireplace. Connected to the closure 13 at its forward edge, or at the edge farthest from the hinged side, is a reflector plate 19 having a laterally directed upper edge 20 to engage over one of the bars of the grate, as represented in Fig. 1, and thus close the space between the grate and the closure 13. The member 19 also serves as a cut-off to prevent outward radiation of the heat, or away from the receptacle.

The member 19—20 may be of any required size and of any suitable material but will preferably be of a heavy grade of tinned steel so that its polished surface will reflect the heat waves downwardly and rearwardly upon the closure 13, and thus increase the heating qualities.

In Fig. 4 the improved device is shown without the hinge closure 13 and its handle 16, which arrangement may be employed for cooking certain kinds of foods, if required.

The improved device is simple in construction, can be inexpensively manufactured and adapted without material structural change to open fireplace grates of different sizes.

Having thus described the invention, what is claimed as new is:

1. A cooking utensil comprising a receptacle, a closure for the receptacle, and a combined cut-off and deflector rising from the closure and removable therewith from over the receptacle.

2. A cooking utensil comprising a receptacle, a closure for the receptacle hingedly united at one edge to the receptacle, and a combined cut-off and deflector rising from the closure at its free edge.

3. A cooking utensil comprising a receptacle, a closure for the receptacle, and a combined cut-off and deflector rising from the closure, and having its inwardly directed edge adapted to be inserted between the bars of a grate.

In testimony whereof I affix my signature in presence of two witnesses.

RICHARD B. McGEE. [L. S.]

Witnesses:
JNO. R. WOOSLEY,
H. B. CHESNEY.

Copies of this patent may be obtained for five cents each, by addressing the "Commissioner of Patents, Washington, D. C."